United States Patent
Villbrandt et al.

[11] Patent Number: 5,862,896
[45] Date of Patent: Jan. 26, 1999

[54] DEVICE FOR DAMPENING THE MOVEMENT OF A PIVOTALLY SUPPORTED STRUCTURAL PART, FOR EXAMPLE, A FLAP IN AN AUTOMOBILE

[75] Inventors: Ute Villbrandt, Henstedt-Ulburg; Hans-Günther Müller, Würzburg, both of Germany

[73] Assignee: ITW-ATECO GmbH, Germany

[21] Appl. No.: 956,151

[22] Filed: Oct. 22, 1997

[30] Foreign Application Priority Data

Dec. 4, 1996 [DE] Germany .................. 296 21 043.9

[51] Int. Cl.⁶ .................. F16D 57/02; E05F 3/00; E05F 3/04
[52] U.S. Cl. .................. 188/293; 188/296; 188/322.5; 16/49; 16/51; 74/89.17
[58] Field of Search .................. 188/290–296, 188/302, 303, 322.5; 16/49, 51, 58, 62; 74/89.17; 92/136

[56] References Cited

U.S. PATENT DOCUMENTS

| | | | |
|---|---|---|---|
| 3,918,558 | 11/1975 | Bryant | 188/302 |
| 4,115,897 | 9/1978 | Zunkel | 16/49 |
| 4,378,612 | 4/1983 | Beers | 16/62 |
| 4,506,825 | 3/1985 | Grant | 74/89.17 |
| 4,580,365 | 4/1986 | Sieg | 16/49 |
| 4,660,881 | 4/1987 | Komeya et al. | 188/322.5 |
| 5,076,379 | 12/1991 | Bahr et al. | 74/89.17 |
| 5,323,884 | 6/1994 | Machino | 74/89.17 |
| 5,353,690 | 10/1994 | Shiu | 74/89.17 |
| 5,381,877 | 1/1995 | Kobayashi | 188/290 |
| 5,385,218 | 1/1995 | Migliovi | 188/303 |
| 5,617,760 | 4/1997 | Woeste et al. | 188/290 |

Primary Examiner—Robert J. Oberleitner
Assistant Examiner—Chris Schwartz
Attorney, Agent, or Firm—Schwartz & Weinrieb

[57] ABSTRACT

A device for dampening the movement of a pivotally supported structural part, for example, a flap or closure within an automobile, comprises a pivot arm attached to the structural part, and a rack operatively connected to the pivot arm. A housing is rotatably supported upon a support surface or member, and a rotor is rotatably disposed within the housing along with a viscous fluid which tends to dampen rotary motion of the rotor. The rotor also comprises a pinion which is enmeshed with the rack, and the housing comprises a pair of guides for confining movement of the rack in a translational or rectilinear mode while maintaining the rack enmeshed with the rotor pinion. Consequently, when the flap or closure is either opened or closed, the flap or closure is moved in a dampened mode due to the movement of the pivot arm and the rack relative to the dampened rotor pinion. As a result of the rotary mounting of the housing, and the provision of the rack guides, the rack undergoes both rotary and translational movements while being maintained enmeshed with the rotor pinion.

14 Claims, 2 Drawing Sheets

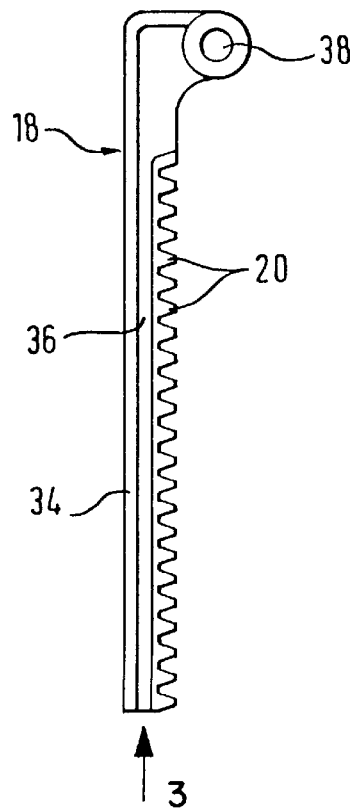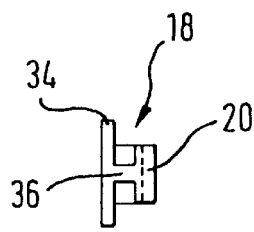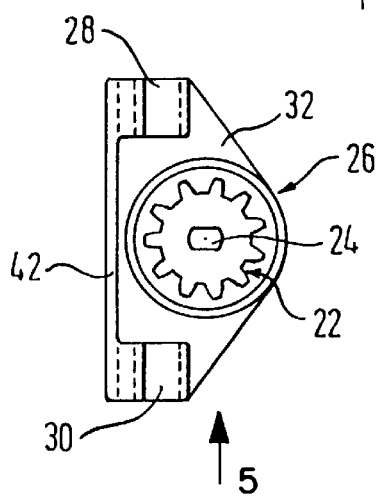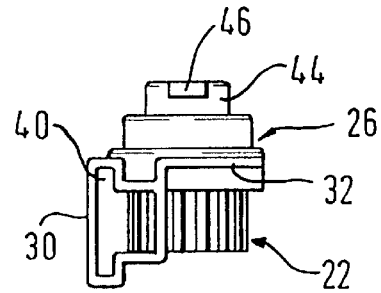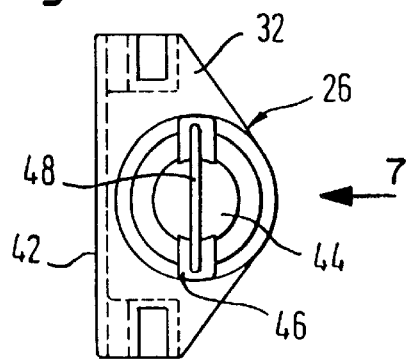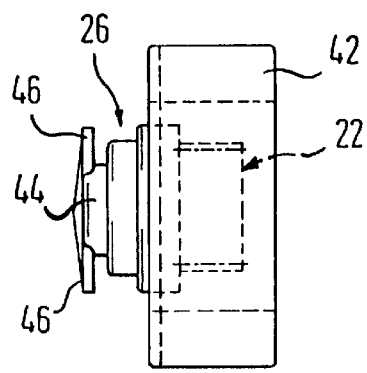

DEVICE FOR DAMPENING THE MOVEMENT OF A PIVOTALLY SUPPORTED STRUCTURAL PART, FOR EXAMPLE, A FLAP IN AN AUTOMOBILE

BACKGROUND OF THE INVENTION

1. Field of the Invention

The present invention relates generally to dampening devices, and more particularly to a device for dampening the movement of a pivotally supported structural part, such as, for example, a flap or closure within an automobile. It has become known to dampen pivotal movements of structural parts in the interior of an automobile, for example a flap for closing a glove compartment, an ashtray or the like or even a handle. To this end rotary dampers are usually used. Conventional rotary dampers include a rotor which is rotatably mounted in a housing. A braking fluid such as a silicone oil between the rotor and the housing provides for a dampening action when the rotor is being rotated in the housing. Usually a pinion in engagement with a tooth segment is mounted upon the rotor shaft. The tooth segment is of circular arc shape due to the rotary movement of the structural part to be dampened. The design of the circular arc shaped tooth segment is to be adapted to the mounting location because the radius depends on the mounting location. Furthermore guidance of the tooth segment at the pinion may cause problems, in particular noise problems. Unprecise engagement between the rack and the pinion may generate unacceptable noises. At substantial loads the pinion may slide along the rack.

2. Object of the Invention

The primary object of the invention is to provide a device for dampening the movement of a pivotally supported structural part, in particular a flap in an automobile, under use of a rotary damper dampening a translatory movement.

SUMMARY OF THE INVENTION

In the device of the invention a pivot arm is mounted upon the structural part to be dampened, with a straight rack being pivotally mounted to the pivot arm. A rotary damper is mounted upon a stationary housing member, which rotary damper generally comprises a housing, a rotor and a damping fluid as well as a pinion on the rotor shaft. The linear rack engages the pinion. Furthermore a linear guide means for the rack is provided, which linear guide means is supported for rotation about the axis of the rotor shaft and keeps the rack in engagement with the pinion irrespective of the rotary position of the rack. Pivoting the structural part to be dampened will result in a combined movement of the rack in its plane, namely a rotary movement for pivoting the rack, and a translatory movement. The guide means enables translatory movements of the rack within the guide and corresponding rotary movements of the pinion. Pivotal movements of the rack are accommodated by the rotating guide means. Any movement of the structural member to be dampened will result in linear movements within the guide means and a respective dampening action by means of the rotary damper.

Accordingly circular movements become dampened translatory movements in the device of the invention. Precise guidance of the rack avoids generation of noises, ensures respective engagement with the damper, and reduces wear.

The guide means may be pivotally mounted upon the housing of the rotary damper. As an alternative the guide means may be a part of the damper housing and the housing may be mounted for rotation about the axis of the rotor shaft in a stationary structural part. To this end a bearing pin can be provided on the side of the housing opposite to the pinion, which bearing pin cooperates with a hole of a retaining member by means of a bayonet type connection means in order to allow for limited rotation of the housing about the axis of the rotor.

In a further embodiment of the invention the rack has a guide portion of T-shaped cross section, the guide portion extending in parallel spaced relationship with respect to the linear toothing of the rack, and the guide means includes a passage portion of a complementary cross section. This enables the guide means of the rack to be closely adjacent to the teeth, and the guide passage portion may be closely adjacent to the rotor shaft such that the total damper unit requires minimal space.

The passage portion for guiding the rack is preferably provided at a radial flange which is provided at an end of the housing.

BRIEF DESCRIPTION OF THE DRAWINGS

Various other objects, features, and attendant advantages of the present invention will be more fully appreciated from the following detailed description when considered with reference to the accompanying drawings in which like reference characters designate like or corresponding parts throughout the several views, and wherein:

FIG. 2 is a view which shows the rack of the device in FIG. 1 in a separate view;

FIG. 3 is an end view of the rack in FIG. 2 in the direction of arrow 3;

FIG. 4 is a view which shows the rotary damper in the same side elevation as in FIG. 1;

FIG. 5 is a view of the rotary damper in FIG. 4 in the direction of arrow 5;

FIG. 6 is an end view of the rotary damper in FIG. 1;

FIG. 7 is a side elevation of the rotary damper in FIG. 6 in the direction of arrow 7.

DETAILED DESCRIPTION OF THE PREFERRED EMBODIMENT

Figure 1:
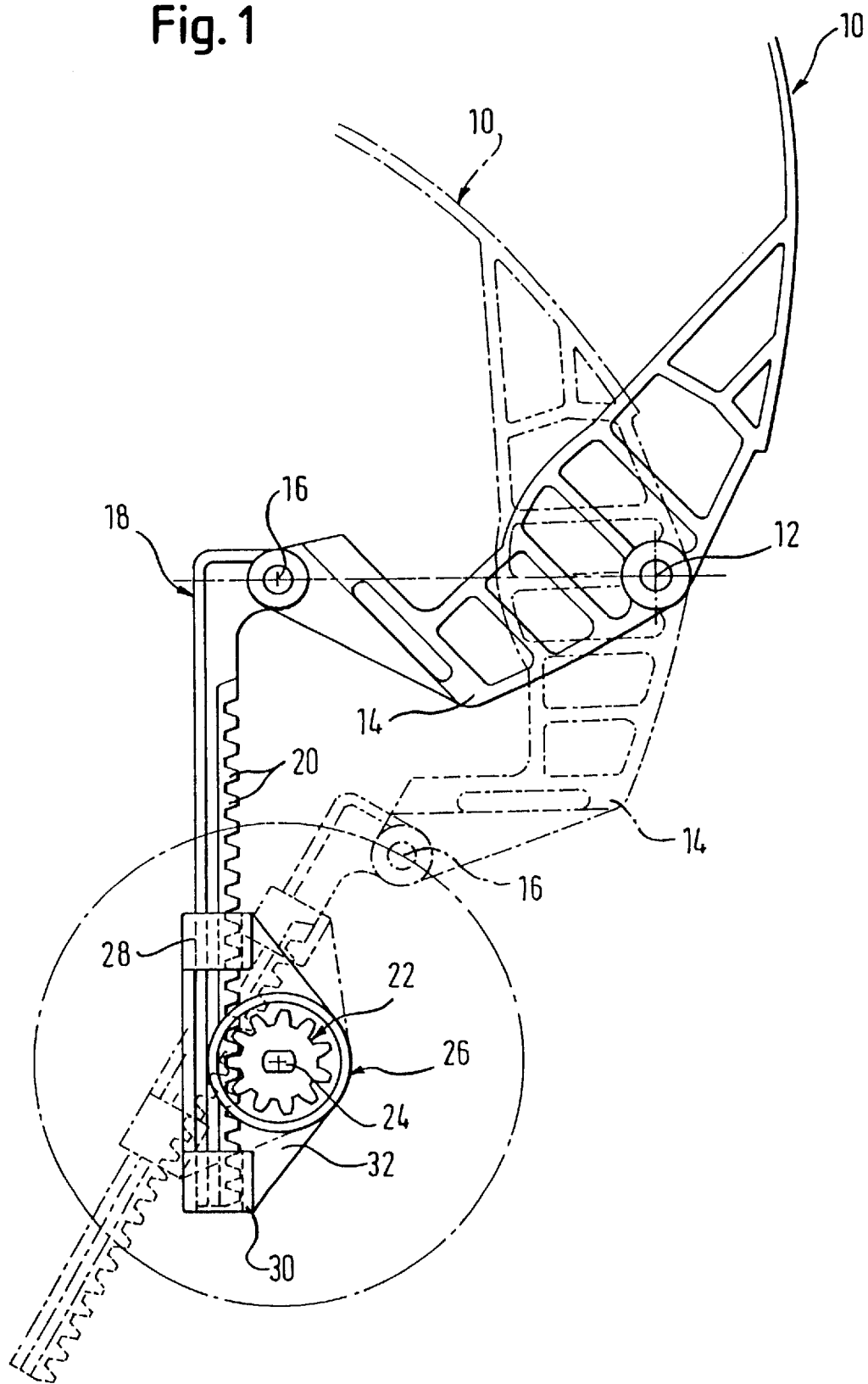
FIG. 1 is a view which shows schematically the device of the invention in a side elevation.

FIG. 1 shows a flap 10, for example for closing a glove compartment in an automobile. The flap 10 is mounted so as to be pivotal about a horizontal axis 12. A pivot arm 14 is integrally connected to the flap 10 on the opposite side of the pivot axis 12 and is pivotally mounted to a rack 18 by means of a pivot 16. The rack 18 comprises linearly arranged teeth 20 which are in engagement with a pinion 22. The pinion 22 is mounted to a shaft 24 of a rotor not shown. The rotor is rotatably mounted within a housing 26. The housing 26 contains a breaking fluid which dampens movements of the rotor when it is being rotated.

The rack 18 cooperates with guide portions 28, 30 integral with a radial flange of the housing 26 on opposite sides of the pinion 22. Further details may be taken from the other drawing figures.

As may be seen in FIG. 3 the rack 18 has a guide portion of T-shaped cross section including a flange portion 34 and a web portion 36. The web portion 36 interconnects the flange portion 34 and the portion which carries the teeth 20. A mounting gear 38 is formed at one end of the rack 18.

FIG. 5 shows the shape and structure of the guiding cross section of the guide portions 28, 30. A channel 40 of a shape complementary to that of the flange portion 34 of rack 18 is arranged to linearly guide the flange portion 34, with the pinion 22 engaging the teeth 20 of the rack 18. The guide portions 28, 30 are connected to each other by means of a web 42 for stabilizing purposes. Furthermore the web 42 defines a further guide means for the free side of the flange portion 34 of the rack 18. A cylindrical extension 44 coaxial to the axis of the rotor shaft 24 is provided on the side of the housing 26 opposite to that of the pinion 22. Radial projections 46 extend on opposite sides of the cylindrical extension 44 in spaced relationship to the housing 26 as may be seen in particular in FIG. 7. They are part of a bayonet-type connection and are arranged to cooperate with a respective hole in a holding member such that the housing 26 can perform a limited rotary movement about the axis of the rotor shaft 24.

FIG. 1 shows the flap 10 in a partially opened position by continuous lines. The closed position thereof is shown by dotted lines. When the flap 10 is moved from the closed position to the opened position, the pivot arm 14 performs a pivotal movement such that the rack 18 is both pivoted and translated as may be seen from the two sketches. The guidance of the rack 18 in the guide portions 28, 30 enables the translatory movements of the rack 18 with respect to the pinion 22 such that it will be rotated in order to dampen the movement of the flap 10.

Obviously, many modifications and variations of the present invention are possible in light of the above teachings. It is therefore to be understood that within the scope of the appended claims, the present invention may be practiced otherwise than as specifically described herein.

We claim:

1. A system for dampening the movement of a pivotally supported structural part, comprising:

a pivotally supported structural part;

a pivot arm operatively connected to said pivotally supported structural part;

a rack operatively connected to said pivot arm;

a rotary damper housing within which is rotatably disposed a rotor mounted upon a rotor shaft and a viscous fluid acting between said housing and the rotor for dampening rotary movement of the rotor;

a pinion rotatably mounted upon said rotor shaft and enmeshed with said rack; and guide means, rotatably supported about the rotary axis of said rotor shaft and said pinion and operatively engaged with said rack, for maintaining said rack in engagement with said pinion irrespective of the positional orientation of said rack in response to pivotal movements of said pivotally support structural part.

2. The system of claim 1, wherein:

said rack has a guide portion T-shaped in cross section and extending in parallel spaced relationship with respect to teeth of said rack with which said pinion is enmeshed; and said guide means includes a passage portion having a cross section configuration which is complementary to said T-shaped guide portion of said rack.

3. The system of claim 2, wherein:

said guide means comprises a pair of guides, each having a passage portion for accommodating said rack, located upon opposite sides of said pinion for guiding said rack.

4. The system of claim 2 wherein:

said housing comprises a radial flange formed upon said housing adjacent to said pinion; and said passage portion is formed upon said radial flange.

5. The system of claim 1, wherein:

said housing has a bearing pin on the side thereof which is disposed opposite the side upon which said pinion is mounted, said bearing pin adapted to cooperate with a hole, defined within a support member, through a bayonet connection means so as to allow for limited rotation of said housing with respect to the support member.

6. The system of claim 1, wherein:

said guide means is part of said rotary damper housing; and said rotary damper housing is supported for rotation about said axis of said rotor shaft.

7. The system as set forth in claim 1, wherein:

said rack has a linear configuration.

8. The system as set forth in claim 1, wherein:

said pivotally supported structural part comprises a closure member for use within an automobile and adapted to undergo opening and closing movements.

9. A system for dampening the movement of a pivotally supported structural part, comprising:

a pivotally supported structural part;

a pivot arm integrally connected to said pivotally supported structural part;

a linear rack pivotally connected at one end thereof to said pivot arm, and having a plurality of teeth formed thereon;

a rotary damper housing within which is rotatably disposed a rotor mounted upon a rotor shaft, and a viscous fluid for dampening rotary movement of the rotor;

a pinion rotatably mounted upon said rotor shaft and enmeshed with said linear rack;

means for rotatably mounting said rotary damper housing upon a support surface such that said rotary damper housing is permitted to undergo rotatable movement about the axis of said rotor shaft in response to pivotal movements of said pivotally supported structural part; and guide means mounted upon said rotary damper housing and operatively engaged with said linear rack for maintaining said linear rack enmeshed with said pinion when said linear rack undergoes translational and pivotal movements with respect to said pinion in response to pivotal movement of said pivotally supported structural part, said pivot arm, and said rotary damper housing.

10. The system as set forth in claim 9, wherein:

said linear rack has a substantially T-shaped cross-sectional configuration.

11. The system as set forth in claim 10, wherein:

said guide means has a substantially T-shaped cross-sectional configuration complementary to said substantially T-shaped cross-sectional configuration of said linear rack.

12. The system as set forth in claim 9, wherein:

said guide means comprises a pair of guides located upon opposite sides of said pinion for guiding linearly spaced portions of said linear rack.

13. The system as set forth in claim 9, wherein:

said pivotally supported structural part comprises a closure member for use within an automobile and is adapted to undergo opening and closing movements.

14. The system as set forth in claim 9, wherein:

said means for rotatably mounting said rotary damper housing comprises bearing means in the form of a bayonet connection for rotatable mounting within the support surface.

* * * * *